UNITED STATES PATENT OFFICE.

PAUL JULIUS, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION OF GERMANY.

RED AZO DYE.

SPECIFICATION forming part of Letters Patent No. 718,356, dated January 13, 1903.

Application filed May 27, 1902. Serial No. 109,224. (No specimens.)

*To all whom it may concern:*

Be it known that I, PAUL JULIUS, doctor of philosophy and chemist, subject of the Emperor of Austria-Hungary, residing at Ludwigshafen-on-the-Rhine, in the Kingdom of Bavaria, Germany, have invented new and useful Improvements in Red Dyes, of which the following is a specification.

This invention relates to a new monoazo coloring-matter which on account of the very sparing solubility in alcohol and in water of its compounds containing barium, calcium, or aluminium promises to be of value in the production of coloring-matter lakes, which lakes may be prepared according to known methods.

In the following an example is given according to which this new coloring-matter may be obtained. The parts are by weight.

Example: Dissolve with the aid of heat two hundred and twenty-seven (227) parts of the acid sodium salt of 2-naphthylamin-1.5-disulfo-acid in fifty-five (55) parts of ammonia-water containing twenty (20) per cent. of ammonia, $(NH_3)$. Cool and add forty-eight (48) parts of sodium nitrite. Run this result, while stirring, into a mixture of two hundred and twenty-five (225) parts of hydrochloric acid containing about thirty-seven (37) per cent. of that acid (HCl) and seven hundred (700) parts of ice. When diazotation is completed, run the result in a fine stream into a solution of one hundred and five (105) parts of beta-naphthol in one hundred and twenty (120) parts of caustic-soda lye containing thirty-five (35) per cent. of caustic soda (NaOH) and one hundred and eighty-five (185) parts of calcined carbonate of soda in one thousand (1,000) parts of water. Stir for about one half-hour, bring to a boil, and add to the boiling liquid five thousand (5,000) parts of hot salt brine containing about one thousand seven hundred and fifty (1,750) parts of common salt. Filter off the precipitated coloring-matter while hot and preserve it in either paste or powder form.

The coloring-matter so obtained in the dry and powdered state is of a red color and dissolves in water, producing a solution having a yellowish-red color, in which solution hydrochloric acid produces a reddish-violet precipitate. On suitable reduction with hydrochloric acid and stannous chlorid the coloring-matter yields alpha-amido-beta-naphthol and 2-naphthylamin-1.5-disulfo-acid, which may be separated and identified in any suitable manner.

What is claimed is—

As a new article of manufacture monoazo coloring-matter which on reduction with hydrochloric acid and stannous chlorid yields alpha-amido-beta-naphthol and 2-naphthylamin-1.5-disulfo-acid.

In testimony whereof I have hereunto set my hand in the presence of two subscribing witnesses.

PAUL JULIUS.

Witnesses:
ERNEST F. EHRHARDT,
JACOB ADRIAN.